(12) United States Patent
Bajic et al.

(10) Patent No.: US 11,387,091 B2
(45) Date of Patent: Jul. 12, 2022

(54) ION SOURCE

(71) Applicant: Micromass UK Limited, Wilmslow (GB)

(72) Inventors: Stevan Bajic, Sale (GB); David Douce, Congleton (GB); Scott Pritchard, Crownhill (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/254,492

(22) PCT Filed: Jun. 20, 2019

(86) PCT No.: PCT/GB2019/051738
§ 371 (c)(1),
(2) Date: Dec. 21, 2020

(87) PCT Pub. No.: WO2019/243830
PCT Pub. Date: Dec. 26, 2019

(65) Prior Publication Data
US 2021/0166929 A1 Jun. 3, 2021

(30) Foreign Application Priority Data

Jun. 21, 2018 (GB) ..................... 1810219

(51) Int. Cl.
| | |
|---|---|
| *G01N 27/623* | (2021.01) |
| *H01J 49/04* | (2006.01) |
| *G01N 1/40* | (2006.01) |
| *H01J 49/00* | (2006.01) |
| *G01N 1/02* | (2006.01) |

(52) U.S. Cl.
CPC ............ *H01J 49/049* (2013.01); *G01N 1/405* (2013.01); *G01N 27/623* (2021.01); *H01J 49/0031* (2013.01); *H01J 49/0422* (2013.01); *G01N 2001/028* (2013.01)

(58) Field of Classification Search
CPC .. H01J 49/049; H01J 49/0031; H01J 49/0422; G01N 27/623; G01N 1/405; G01N 2001/028; G01N 1/02
USPC .............................. 250/281, 282, 288, 423 R
See application file for complete search history.

(56) References Cited

U.S. PATENT DOCUMENTS

| | | | | |
|---|---|---|---|---|
| 4,933,548 | A * | 6/1990 | Boyer | H01J 49/0459 250/288 |
| 2008/0121797 | A1 | 5/2008 | Wu | |
| 2008/0128615 | A1* | 6/2008 | Yamada | G01N 30/7206 250/288 |
| 2012/0126109 | A1* | 5/2012 | Wu | G01N 27/622 250/282 |

(Continued)

OTHER PUBLICATIONS

International Search Report and Written Opinion for International Application No. PCT/GB2019/051738, dated Sep. 24, 2019.

(Continued)

*Primary Examiner* — Michael Maskell
(74) *Attorney, Agent, or Firm* — Goodwin Procter LLP

(57) ABSTRACT

A method of ionisation is disclosed in which a sample is heated such that analyte is released from the sample. Analyte released from the sample is accumulated, and then the accumulated analyte is passed to an ionisation region where the analyte is ionised.

18 Claims, 5 Drawing Sheets

(56) References Cited

U.S. PATENT DOCUMENTS

| | | | |
|---|---|---|---|
| 2012/0180576 A1 | 7/2012 | Rafferty et al. | |
| 2013/0042703 A1* | 2/2013 | Hutchinson | H01J 49/105 |
| | | | 73/864.84 |
| 2017/0016856 A1 | 1/2017 | Zhang et al. | |
| 2017/0176299 A1* | 6/2017 | Zhang | H01J 49/0468 |

OTHER PUBLICATIONS

Combined Search and Examination Report for GB Application No. GB1810219.4, dated Dec. 13, 2018.

* cited by examiner

ION SOURCE

CROSS-REFERENCE TO RELATED APPLICATIONS

This application is a U.S. national phase filing claiming the benefit of and priority to International Patent Application No. PCT/GB2019/051738, filed Jun. 20, 2019, which claims priority from and the benefit of United Kingdom patent application No. 1810219.4 filed on Jun. 21, 2018. The entire contents of these applications are incorporated herein by reference.

FIELD OF THE INVENTION

The present invention relates generally to ion sources for mass and/or ion mobility spectrometers, and in particular to ambient ionisation ion sources.

BACKGROUND

Ambient ionisation sources are commonly used in combination with ion mobility (IM) detectors and/or mass spectrometer (MS) devices to detect the presence of low levels of hazardous materials, such as explosives or chemical warfare agents. The standard protocol for security screening is to wipe a sample swab against the item that is under scrutiny. This transfers any potentially hazardous material onto the swab which is then placed into a thermal desorption oven that, in turn, is located adjacent to an ionization source. Sample molecules that are ionized in the ambient source are then analysed by the IM or MS detector.

The Applicants believe that there remains scope for improvements to ionisation sources.

SUMMARY

According to an aspect there is provided a method of ionisation comprising:

heating a sample such that analyte is released from the sample;

accumulating analyte released from the sample; and then passing the accumulated analyte to an ionisation region and ionising the analyte.

Various embodiments are directed to an ionisation method in which a sample to be analysed is heated so that analyte (e.g. gas phase analyte molecules) is released from the sample, and the analyte is then ionised in an ionisation region. However, in various embodiments, the (gas phase) analyte is accumulated for a period of time (while the sample is being heated) before it is passed to the ionisation region for ionisation.

In various embodiments, the (first) period of time during which analyte is accumulated is sufficient to allow an increased concentration of (gas phase) analyte to be accumulated. The so-accumulated analyte may then be passed to the ionisation region during a second period of time that (immediately) follows the first period of time, and that is shorter than the first period of time.

As will be described in more detail below, this means that the analyte that reaches the ionisation region has an increased concentration, e.g. compared to conventional arrangements in which analyte is continuously passed to an ionisation region while a sample is being heated. This in turn means that the sensitivity of the analysis is increased.

It will be appreciated, therefore, that the present invention provides an improved method of ionisation.

The Method May Comprise:

accumulating analyte released from the sample during a first period of time; and passing the accumulated analyte to the ionisation region during a second period of time that may follow the first period of time.

The second period of time may be shorter than the first period of time.

The method may comprise heating the sample and accumulating analyte released from the sample in one or more heating and/or accumulation regions.

The method may comprise operating a first inlet valve and a first outlet valve in a closed state while accumulating the analyte.

The method may comprise passing the accumulated analyte to the ionisation region by opening the first inlet valve and the first outlet valve.

The method may comprise operating a bypass valve in an open state while accumulating the analyte.

The method may comprise operating the bypass valve in a closed state while passing the accumulated analyte to the ionisation region.

The method may comprise operating the first inlet valve in an open state and operating a second outlet valve in an open state before accumulating the analyte and/or after passing the accumulated analyte to the ionisation region.

The method may comprise operating a second inlet valve in an open state, operating the second outlet valve in an open state, operating the first inlet valve in a closed state, and operating the first outlet valve in a closed state before accumulating the analyte and/or after passing the accumulated analyte to the ionisation region.

The method may comprise passing gas from a test volume into the one or more heating and/or accumulation regions before heating the sample.

The sample may be adsorbed onto or within an adsorbate or adsorber that may be provided within or as part of the one or more heating and/or accumulation regions.

According to an aspect there is provided a method of ionisation comprising:

passing gas from a test volume into one or more heating and/or accumulation regions, where the one or more heating and/or accumulation regions comprise an adsorbate or adsorber, and wherein analyte from the test volume may become adsorbed onto or within the adsorbate or adsorber;

heating the adsorbate or adsorber such that analyte is released from the adsorbate or adsorber;

accumulating analyte released from the adsorbate or adsorber; and then passing the accumulated analyte to an ionisation region and ionising the analyte.

According to an aspect there is provided a method of mass and/or ion mobility spectrometry comprising:

ionising analyte using the method as described above so as to produce analyte ions; and analysing the analyte ions or ions derived from the analyte ions.

According to an aspect there is provided an ion source comprising:

a heater configured to heat a sample such that analyte is released from the sample;

one or more accumulation regions arranged to accumulate analyte released from the sample; and an ionisation region comprising an ionisation device configured to ionise the analyte;

wherein the ion source is configured to accumulate analyte released from the sample before passing the accumulated analyte to the ionisation region.

The ion source may be configured to accumulate analyte released from the sample during a first period of time.

The ion source may be configured to pass the accumulated analyte to the ionisation region during a second period of time that may follow the first period of time.

The second period of time may be shorter than the first period of time.

The one or more accumulation regions may comprise one or more chambers.

The ion source may comprise a first inlet valve and a first outlet valve.

The ion source may be configured to operate the first inlet valve and the first outlet valve in a closed state while analyte is being accumulated.

The ion source may be configured to open the first inlet valve and the first outlet valve so as to pass the accumulated analyte to the ionisation region.

The ion source may comprise a bypass valve.

The ion source may be configured to operate the bypass valve in an open state while accumulating the analyte.

The ion source may be configured to operate the bypass valve in a closed state while passing the accumulated analyte to the ionisation region.

The ion source may comprise a second outlet valve.

The ion source may be configured to operate the inlet valve in an open state and to operate the second outlet valve in an open state before accumulating the analyte and/or after passing the accumulated analyte to the ionisation region.

The ion source may comprise a second inlet valve.

The ion source may be configured to operate the second gas inlet valve in an open state, to operate the second outlet valve in an open state, to operate the first gas inlet valve in a closed state, and to operate the first gas outlet valve in a closed state before accumulating the analyte and/or after passing the accumulated analyte to the ionisation region.

The one or more accumulation regions may comprise an adsorbate or adsorber.

The ion source may be configured to pass gas from a test volume into the one or more accumulation regions before heating the sample.

The sample may be adsorbed onto or within the adsorbate or adsorber.

According to an aspect there is provided an ion source comprising:

one or more heating and/or accumulation regions comprising an adsorbate or adsorber, wherein the ion source is configured to pass gas from a test volume into the one or more heating and/or accumulation regions such that analyte from the test volume may become adsorbed onto or within the adsorbate or adsorber;

a heater configured to heat the adsorbate or adsorber such that analyte is released from the adsorbate or adsorber, wherein the one or more heating and/or accumulation regions are arranged to accumulate analyte released from the adsorbate or adsorber; and an ionisation region comprising an ionisation device configured to ionise the analyte;

wherein the ion source is configured to accumulate analyte released from the adsorbate or adsorber in the one or more heating and/or accumulation regions before passing the accumulated analyte to the ionisation region for ionisation.

According to an aspect there is provided a mass and/or ion mobility spectrometer comprising:

an ion source as described above; and an analyser configured to analyse analyte ions produced by the ion source or ions derived from analyte ions produced by the ion source.

BRIEF DESCRIPTION OF THE DRAWINGS

Various embodiments will now be described, by way of example only, and with reference to the accompanying drawings in which.

DETAILED DESCRIPTION

Figure 1:
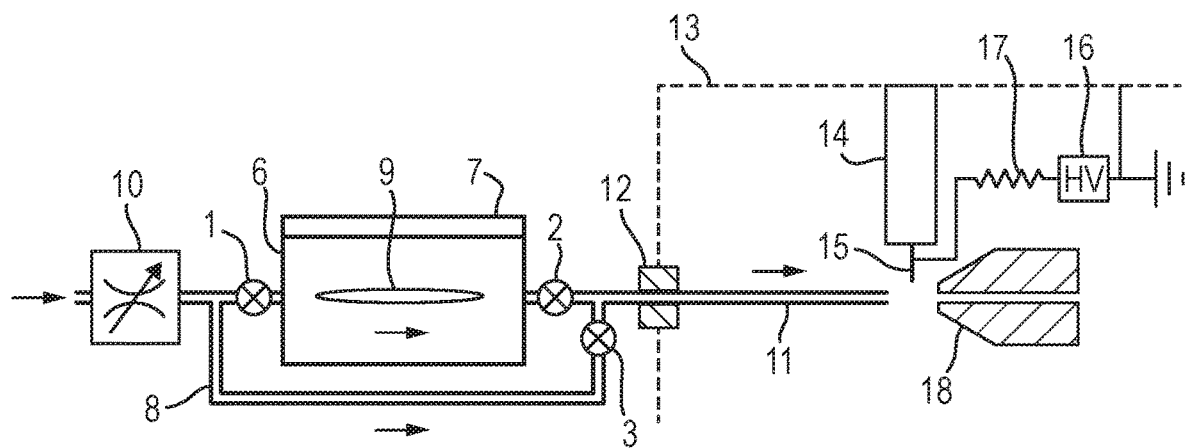
FIG. 1 shows schematically an ion source in accordance with various embodiments.

Various embodiments are directed to an ionisation method in which a sample is heated such that analyte is released from the sample, analyte released from the sample is accumulated during a first period of time, and then the accumulated analyte is passed to an ionisation region for ionisation during a second period of time that follows the first period of time.

The sample may comprise any suitable sample. The sample may comprise at least part of a sample of interest, i.e. for which it is desired to determine the chemical composition of the sample and/or whether the sample comprises a particular category of substance.

In various particular embodiments, the sample may comprise one or more hazardous materials, such as one or more explosive substances or chemical warfare agents, one or more involatile substances, one or more biological samples, one or more food samples, one or more drug samples, one or more hydrocarbons such as oil, fuel additives, etc.

However, the sample may more generally comprise any suitable sample. For example, the sample may in general comprise one or more involatile or volatile substances.

The sample may be provided in any suitable manner. In various embodiments, the sample is provided on a carrier such as a swab, e.g. a cotton swab, having the sample deposited thereon and/or therein.

The sample may be provided on the sample carrier in any suitable manner. The sample may, for example, be deposited directly onto the sample carrier, and/or the sample carrier may be wiped against a surface of a sample, e.g. swabbed, so that a portion of the sample is retained on the sample carrier.

However, it is not necessary for the sample to be deposited on (or in) a separate carrier, and (where appropriate) the sample may be provided directly to the ion source (without a sample carrier).

The sample may be heated in any suitable manner. The sample should be heated so that at least some analyte of the sample is released from the sample, e.g. so that analyte molecules of the sample are desorbed and/or evaporated from the sample.

The sample may be heated to any suitable temperature sufficient for analyte to be released from the sample. According to various embodiments, the sample is heated to a temperature of (i) ≥100° C.; (ii) ≥150° C.; (iii) ≥200° C.; (iv) ≥250° C.; (v) ≥300° C.; (vi) ≥350° C.; (vii) ≥400° C.; (viii) ≥500° C.; (viii) ≥600° C.; (viii) ≥700° C.; or (viii) ≥800° C.

In various embodiments, the sample (e.g. together with the carrier) is heated in a (enclosed) heating region such as an oven. In various particular embodiments, the sample is heated in a thermal desorption oven, e.g. a swab desorption oven.

As such, the method may comprise introducing the sample to a heating region, e.g. automatically or manually locating the sample (optionally together with its carrier) in a sample oven, and then heating the sample.

The heating region (e.g. oven) may be configured in any suitable manner. In various embodiments, the heating region comprises one or more (enclosed) chambers (e.g. a single enclosed chamber) into which the sample (optionally together with its carrier) can be placed.

In various embodiments, the analyte that is released from the sample comprises gas phase analyte, e.g. gas phase analyte molecules.

The analyte that is released from the sample may be accumulated in any suitable manner. In various embodiments, the analyte is accumulated in the heating region, e.g. in the one or more chambers (of the oven). Accumulating analyte in the same region (chamber) as the analyte is produced represents a particularly straightforward and convenient arrangement for accumulating analyte.

It would, however, be possible for the analyte to be accumulated in one or more other accumulation regions, e.g. one or more chambers, e.g. that may be separate from (but connected to) the heating region (chamber).

The analyte may be accumulated in the heating (or accumulation) region by preventing the analyte from leaving the region during the first period of time.

In various embodiments, analyte is accumulated in the heating (or accumulation) region for a first period of time. The sample should be (and in various embodiments is) heated (such that analyte is released from the sample) during some, most or all of the first period of time.

The first period of time may have any suitable duration, e.g. sufficient to allow analyte to become concentrated within the heating (or accumulation) region. As such, the first period of time may have a duration of the order of seconds, tens of seconds, minutes or more. In various embodiments, the first period of time has a duration (i) ≥1 s; (ii) ≥5 s; (iii) ≥10 s; (iv) ≥15 s; (v) ≥20 s; (vi) ≥25 s; (vii) ≥30 s; (viii) ≥40 s; (ix) ≥50 s; and/or (x) ≥60 s.

Once the analyte has been accumulated (i.e. after the first period of time), the accumulated analyte may then be passed to an ionisation region for ionisation.

The accumulated analyte may be passed to the ionisation region during a second period of time, e.g. where the second period of time (immediately) follows the first period of time. The second period of time may be shorter (have a shorter duration) than the first period of time. This means that the analyte that reaches the ionisation region has an increased concentration, e.g. compared to conventional arrangements in which analyte is continuously passed to an ionisation region while the sample is being heated.

The second period of time may have any suitable duration, e.g. less than the first period of time, and sufficient to allow some, most or all of the accumulated analyte to be passed to the ionisation region. As such, the second period of time may have a duration of the order of tens of seconds, seconds or less. In various embodiments, the first period of time has a duration (i) ≤10 s; (ii) ≤5 s; and/or (iii) ≤1 s.

In various embodiments, the ratio of the second period of time $T_2$ to the first period of time $T_1$ ($T_2/T_1$) is (i) ≤0.9; (ii) ≤0.8; (iii) ≤0.7; (iv) ≤0.6; (v) ≤0.5; (vi) ≤0.4; (viii) ≤0.3; (ix) ≤0.2; and/or (x) ≤0.1.

The accumulated analyte may be passed to the ionisation region in any suitable manner.

In various embodiments, a gas flow is used to pass the accumulated analyte from the heating region (or accumulation region) to the ionisation region. The gas flow may comprise any suitable (inert) gas, such as for example nitrogen, air, purified air, and the like.

In various embodiments, the analyte is swept from the heating region (or accumulation region) to the ionisation region by a gas flow, i.e, that passes through the heating region (or accumulation region). This represents a particularly convenient arrangement for passing the analyte to the ionisation region in a relatively short period of time.

The gas flow through the heating region (or accumulation region) may be achieved in any suitable manner. In various embodiments the heating (or accumulation) region (chamber) comprises (at least) a first inlet and (at least) a first outlet.

The first inlet may be configured to allow a gas flow to enter the heating (or accumulation) region (chamber). The first outlet may be configured to allow the gas flow to leave the heating (or accumulation) region (chamber), e.g. such that the gas flow (together with at least some of the accumulated analyte) is then passed to the ionisation region.

The first inlet may be connected to a gas source and/or a gas flow controller, e.g. by one or more pipes or tubes.

The first inlet may comprise a first inlet valve, e.g. operable in at least an open state wherein gas from the gas source can enter the heating (or accumulation) region via the first inlet, and a closed state wherein gas from the gas source is prevented from entering the heating (or accumulation) region via the first inlet. As such, the first inlet valve may be configured such that when the first inlet valve is in an open state, gas from the gas source can (and does) enter the heating (or accumulation) region (chamber) via the first inlet, and when the first inlet valve is in a closed state, gas from the gas source is prevented from entering the heating (or accumulation) region (chamber) via the first inlet.

The first outlet may be connected to the ionisation region, e.g. by one or more pipes or tubes.

The first outlet may comprise a first outlet valve, e.g. operable in at least an open state wherein gas from within the heating (or accumulation) region can leave the heating (or accumulation) region (and pass to the ionisation region) via the first outlet, and a closed state wherein gas within the heating (or accumulation) region is prevented from leaving the heating (or accumulation) region via the first outlet. As such, the first outlet valve may be configured such that when the first outlet valve is in an open state, gas from the heating (or accumulation) region (chamber) can (and does) leave the heating (or accumulation) region (chamber) (and enters the ionisation region), and when the first outlet valve is in a closed state, gas is prevented from leaving the heating (or accumulation) region (chamber) via the first outlet.

In various embodiments, the first inlet valve and the first outlet valve are operated in a closed state when analyte is being accumulated. In various embodiments, the first inlet valve and the first outlet valve are operated in an open state when the analyte is passed to the ionisation region. As such, the step of passing the accumulated analyte to the ionisation region may comprise opening the first inlet valve and the first outlet valve. This may be done so that a gas flow (e.g. from the gas source) sweeps the accumulated analyte from the heating (or accumulation) region (chamber) to the ionisation region.

In various embodiments, the apparatus may further comprise a bypass, e.g. comprising one or more pipes or tubes, connected between the gas source and the ionisation region. The bypass may be configured to allow the gas flow to (selectively) pass (directly) from the gas source to the ionisation region, i.e. to bypass the heating (or accumulation) region (chamber).

The bypass may comprise a bypass valve, e.g. operable in at least an open state wherein gas from the gas source can pass to the ionisation region via the bypass (thereby bypassing the heating (or accumulation) region), and a closed state wherein gas from the gas source is prevented from passing to the ionisation region via the bypass (and is thereby prevented from bypassing the heating (or accumulation) region). As such, the bypass valve may be configured such that when the bypass valve is in an open state, gas from the gas source can (and does) bypass the heating (or accumulation) region (chamber) via the bypass, and when the bypass valve is in a closed state, gas from the gas source is prevented from bypassing the heating (or accumulation) region (chamber) via the bypass.

In various embodiments, the bypass valve is operated in an open state when analyte is being accumulated. In various embodiments, the bypass valve is operated in a closed state when the analyte is passed to the ionisation region. As such, the step of passing the accumulated analyte to the ionisation region may comprise closing the bypass valve.

The provision of a bypass and a bypass valve beneficially allows gas from the gas source to be provided to the ionisation region while analyte is being accumulated in the heating (or accumulation) region, and as such allows gas to be provided to the ionisation region substantially continuously. This means that the (operating conditions of the) ionisation region can be maintained in a relatively stable state, e.g. so that the ionisation process is stable. This substantially reduces or prevents gas composition changes in the ionisation (e.g. discharge) region, which could otherwise affect, e.g. the emission current, capillary tip temperature and/or surface charge state of nearby components. According to various embodiments, the same gas composition or mixture, e.g. the same nitrogen/helium mixture, is substantially maintained at all times.

The first inlet valve and the first outlet valve may be operated in a closed state and the bypass valve may be operated in an open state at other times, e.g. during a "system ready" state.

At least some of the valves may comprise solenoid and/or non-return valves. For instance, the first inlet valve and first outlet valve may comprise non-return valves. In that case, a solenoid valve may optionally also be provided upstream of the first inlet valve, and operated (opened/closed) in synchronisation therewith. The bypass valve may be a solenoid valve. However, other arrangements would of course be possible.

In various further embodiments the heating (or accumulation) region (chamber) comprises a second outlet. The second outlet may be connected to an exhaust or otherwise, e.g. by one or more pipes or tubes.

The second outlet may comprise a second outlet valve, e.g. operable in at least an open state wherein gas from within the heating (or accumulation) region can leave the heating (or accumulation) region (and pass to the exhaust) via the second outlet (e.g. without entering the ionisation region), and a closed state wherein gas within the heating (or accumulation) region is prevented from leaving the heating (or accumulation) region via the second outlet. As such, the second outlet valve may be configured such that when the second outlet valve is in an open state, gas from the heating (or accumulation) region (chamber) can (and does) leave the heating (or accumulation) region (chamber) (and passes to the exhaust), and when the second outlet valve is in a closed state, gas is prevented from leaving the heating (or accumulation) region (chamber) via the second outlet.

In various embodiments, the second outlet valve is operated in a closed state when analyte is being accumulated. In various embodiments, the second outlet valve is operated in a closed state when the analyte is passed to the ionisation region.

In various embodiments, the second outlet valve is operated in an open state at other times, e.g, during the system ready state. In these embodiments, the first inlet valve may also be operated in an open state during these other times, e.g. when the ion source is operated in the system ready state (and the first outlet valve may be operated in a closed state, and the bypass valve may be operated in either an open or close state). This may mean that a gas flow passes through the heating region (or accumulation region) when the ion source is operated in the system ready state. This beneficially allows the heating region (or accumulation region) to be purged during the system ready state.

As such, the method may comprise opening the second outlet valve before the step of accumulating analyte released from the sample and/or after the step of passing the accumulated analyte to the ionisation region. This may be done so that a gas flow (e.g. from the gas source) sweeps through the heating (or accumulation) region (chamber) to the exhaust.

In various further embodiments the heating (or accumulation) region (chamber) comprises a second inlet. The second inlet may be connected to one or more further gas sources and/or mass flow controllers, e.g. by one or more pipes or tubes. The second inlet may be configured to allow a gas flow (from the one or more further gas sources) to enter the heating (or accumulation) region (chamber).

The second inlet may comprise a second inlet valve, e.g. operable in at least an open state wherein gas from the one or more further gas sources can enter the heating (or accumulation) region via the second inlet, and a closed state wherein gas from the one or more further gas sources is prevented from entering the heating (or accumulation) region via the first inlet. As such, the second inlet valve may be configured such that when the second inlet valve is in an open state, gas from the one or more further gas sources can (and does) enter the heating (or accumulation) region (chamber) via the second inlet, and when the second inlet valve is in a closed state, gas from the one or more further gas sources is prevented from entering the heating (or accumulation) region (chamber) via the second inlet.

In various embodiments, the second inlet valve is operated in a closed state when analyte is being accumulated. In various embodiments, the second inlet valve is operated in a closed state when the analyte is passed to the ionisation region.

In various embodiments, the second inlet valve is operated in an open state at other times, e.g. during the system ready state. In these embodiments, the second outlet valve may also be operated in an open state during these other times, e.g. when the ion source is operated in the system ready state (and the first inlet valve may be operated in a closed state, the first outlet valve may be operated in a closed state, and the bypass valve may be operated in either an open or close state). This may mean that a gas flow from the one or more further gas sources passes through the heating region (or accumulation region) when the ion source is operated in the system ready state. This embodiment allows an improved level of control over the purging gas.

As such, the method may comprise opening the second inlet valve (and the second outlet valve) before the step of accumulating analyte released from the sample and/or after the step of passing the accumulated analyte to the ionisation region. This may be done so that a gas flow (e.g. from the one or more other gas source) sweeps through the heating (or accumulation) region (chamber) to the exhaust.

In various further embodiments, the second inlet (and/or the first inlet and/or one or more further inlets) may be connected to a sample volume, e.g. by one or more pipes, tubes and/or pumps. This may be so as to allow gas from the one or more sample volumes to enter the heating (or accumulation) region (chamber). In these embodiments, an adsorbate may be provided within the heating (or accumulation) region (chamber). Additionally or alternatively, an adsorber such as a cryotrap may be provided within or as part of the heating (or accumulation) region.

In these embodiments, the second inlet valve and the second outlet valve may be operated in an open state during a sample introduction mode of operation (and the first inlet valve may be operated in a closed state, the first outlet valve may be operated in a closed state, and the bypass valve may be operated in an open state). This may allow analyte molecules from within the test volume to enter the heating (or accumulation) region (chamber), and to become trapped on the adsorbate surface or within the adsorbate or adsorber.

The second inlet valve and the second outlet valve may then be closed in order to accumulate analyte released from the adsorbate or adsorber (within the heating (or accumulation) region) (and the accumulated analyte may be passed to the ionisation region, e.g. as described above).

In various embodiments, the analyte is ionised in the ionisation region. As such, the ionisation region may comprise an ionisation source configured to ionise the analyte.

In various particular embodiments, the ionisation source comprises an atmospheric pressure ion source such as a Helium Plasma Ionisation (HePI) ion source or an Atmospheric Pressure Chemical Ionisation (APCI) ion source.

However, more generally, the ionisation source may comprise any suitable ionisation source, such as an ionisation source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a rapid evaporative ionization mass spectrometry (REIMS) ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The analyte may be ionised by the ionisation source so as to produce analyte ions. The analyte ions may be analysed, e.g. using mass and/or ion mobility spectrometry.

As such, the analyte ions may be passed through subsequent stages of an analytical instrument (such as a mass and/or ion mobility spectrometer), and e.g. subjected to one or more of: separation and/or filtering using a separation and/or filtering device, fragmentation or reaction using a collision, reaction or fragmentation device, and analysis using an analyser.

The analyte ions may be (directly) analysed, and/or ions derived from the analyte ions may be analysed. For example, some or all of the analyte ions may be fragmented or reacted so as to produce product ions, e.g. using a collision, reaction or fragmentation device, and these product ions (or ions derived from these product ions) may then be analysed.

Suitable collision, fragmentation or reaction cells include, for example: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions;

(xxvii) an ion-metastable molecule reaction device for reacting ions to form adduct or product ions; (xxviii) an ion-metastable atom reaction device for reacting ions to form adduct or product ions; and/or (xxix) an Electron Ionisation Dissociation ("EID") fragmentation device.

Some or all of the analyte ions or ions derived from the analyte ions may be filtered, e.g. using a mass filter. Suitable mass filters include, for example: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and/or (viii) a Wien filter.

According to various embodiments, the analyte ions or ions derived from the analyte ions are mass analysed, e.g. using a mass analyser, i.e. so as to determine their mass to charge ratio.

Suitable mass analysers include, for example: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and/or (xiv) a linear acceleration Time of Flight mass analyser.

Additionally or alternatively, the analyte ions or ions derived from the analyte ions may be analysed using an ion mobility separation device and/or a Field Asymmetric Ion Mobility Spectrometer device.

It will be appreciated that various embodiments are directed to a swab inlet system for ambient mass and/or ion mobility spectrometric analysis. The sample inlet system may use a thermal desorption oven in combination with a series of valves and flow tubes to pre-concentrate analyte from a sample swab prior to analysis by ambient mass and/or ion mobility spectrometry.

The ambient ionisation source according to various embodiments may be used in combination with an ion mobility (IM) detector and/or mass spectrometer (MS) device to detect the presence of low levels of hazardous materials that may present a security risk, such as explosives or chemical warfare agents. In these embodiments, a sample swab may be wiped against an item that is under scrutiny, i.e. so as to transfer any potentially hazardous material onto the swab. The swab may then be placed into a thermal desorption oven that, in turn, may be located adjacent to an ionisation source.

The source may be an Ambient Ionization Source, and e.g. may operate under atmospheric pressure conditions. Sample molecules that are ionised in the ambient source may be analysed by an IM or MS detector.

The sample swab may be in the form of, for example, a 50 mm-diameter cotton disk, although any other alternative swabs or carriers may be used with various geometries and materials, e.g. including Teflon or glass fibre composites, etc.

In conventional arrangements, a swab is placed into an oven and a continuous flow of gas immediately starts to volatilize analytes before the swab has had adequate time to equilibrate to the oven temperature.

Conventional swab ovens are not gas-tight and are constantly being flushed with a carrier gas. As the sample swab is introduced to the oven, volatile components immediately start to volatilize before the swab has reached an equilibrium temperature.

The Applicants have recognised that this produces a broad analyte evolution profile with time that effectively dilutes the analyte concentration as it enters the ionisation source volume. As far as detection limits are concerned, this has the net effect of reducing the sensitivity of the detection technique.

According to various embodiments, an accumulation and concentration effect is achieved with thermally desorbed analytes in a swab oven that traps the gas volume during a heating period and then releases the volume to the ion source at an enhanced concentration. To facilitate this, in accordance with various embodiments, a swab inlet system for ambient MS analysis is provided that incorporates inlet and outlet switching valves on a swab oven for the pre-concentration of thermally desorbed analytes.

FIG. 1 shows schematically a 3-valve swab inlet system in accordance with various embodiments that is interfaced to an ambient helium plasma ionization (HePI) source of a MS. In this system, a sample swab 9 may be placed into a heated, stainless steel swab oven 6 that is nominally gas-tight and includes an oven lid 7 for accessing the oven volume.

A series of on/off valves 1, 2, 3 may be connected to the oven and a by-pass flow tube 8, e.g. by stainless steel tubing. The valves may comprise a swab oven inlet valve 1, a swab oven outlet valve 2, and a by-pass valve 3.

In FIG. 1, the arrows indicate the possible gas flow directions that depend on the on/off state of the valves 1, 2, 3. The gas flow through the system may be regulated by a gas flow controller 10 that may be connected to a (e.g. nitrogen) pressurised gas supply (not shown). The valves 1, 2, 3 can be manually or electronically activated to open or close as required. Gas flow from the swab inlet system may be transferred to the ionisation source via a heated, stainless steel transfer line 11. All internal steel surfaces of the inlet system may be coated in an inert ("non-stick") layer (such as, for example, SILCOSTEEL®, metal carbides, nitrides, silicates and diamond-like coatings (DLC), etc.) to reduce loss of analyte due to surface adsorption.

The ambient ionisation source (in this embodiment a HePI source) may be surrounded by a metallic grounded enclosure 13 that may be open to the environment or may be sealed. In the latter case, the enclosure may include an exhaust for venting the gases from the inlet system and the ambient ionisation source. In order to prevent excessive heat loss from the heated transfer line 11 to the HePI source, the line 11 may be surrounded by an insulator 12 that may be incorporated into the enclosure 13.

The HePI source may comprise a stainless steel capillary 15, e.g. which may have an internal diameter of around 130 µm, an outer diameter of around 230 µm and a length of around 200 mm. This capillary 15 may be pressurized with helium gas, e.g. at a gauge pressure of around 30 psi, which may create a helium gas flow, e.g. of around 160 mL/min, at the tip the capillary that faces the transfer line 11 and the ion inlet cone 18 of the MS.

For the analysis of negatively charged analytes such as explosives, the capillary 15 may be negatively biased, e.g. to around −2.5 kV, with respect to the transfer line 11 and the ion inlet cone 18 which may both be nominally at ground potential. The electric potential may be applied to the capillary 15 via a HV power supply 16 and a current-limiting resistor 17, e.g. that may be in the range 1-10 MΩ. This may create a helium-discharge at the tip of the capillary, e.g. with a current of around 100 µA.

The capillary 15 may be surrounded by an annular heater 14 that may heat a concentric flow of nitrogen gas, e.g. to a temperature in the range 100-250° C. Analyte ions that are created by the helium-discharge may enter the MS through the ion inlet cone 18 for analysis.

Figure 2:
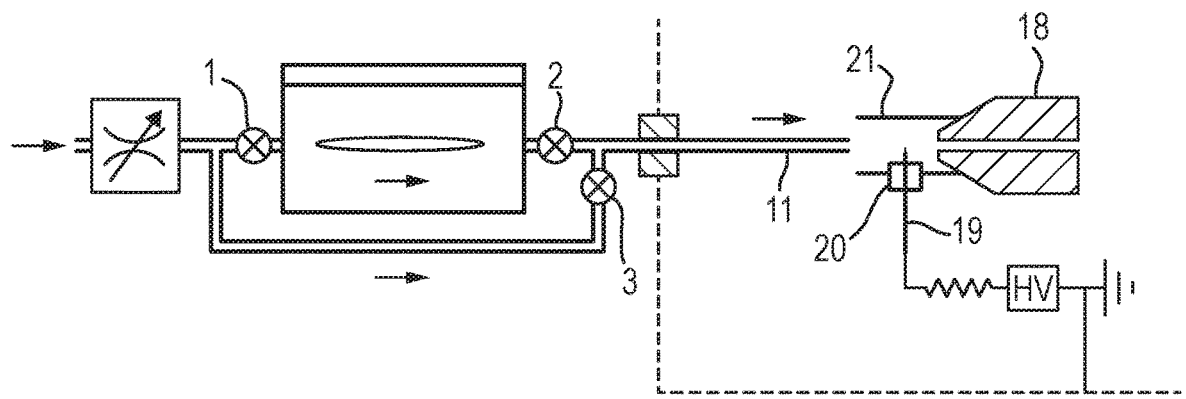
FIG. 2 shows schematically an ion source in accordance with various embodiments.

FIG. 2 shows another embodiment where the swab inlet system is interfaced to an atmospheric pressure chemical ionization (APCI) source. In this type of ionization source, analyte is ionized by a corona discharge, e.g. from a sharp metallic needle 19 that may be insulated from its surroundings by an electrical insulator 20. In this embodiment, ionization may occur in a reduced volume region created by a source tube 21, e.g. which may be partially or fully sealed to the transfer line 11.

Although FIG. 2 shows a seal between the source tube 21 and the ion inlet cone 18, this could also be a partial seal.

It follows that the swab inlet system described herein could be used as an inlet for any type of ambient MS source or any type of atmospheric pressure MS source. It also follows that the swab inlet system is applicable to any type of ambient chemical detector.

In operation, the embodiments of the swab inlet system shown in FIGS. 1 and 2 may be operated according to the sequences shown in Table 1, e.g. by switching the valves 1, 2, 3 as shown in Table 1.

TABLE 1

|  | Valve Status | | |
| --- | --- | --- | --- |
|  | Valve 1 | Valve 2 | Valve 3 |
| System Ready | Closed | Closed | Open |
| Sample Introduction to Oven | Closed | Closed | Open |
| Sample Introduction to MS | Open | Open | Closed |
| System Ready | Closed | Closed | Open |

Referring to Table 1, when the system is not in use or is waiting for a swab sample, the inlet may be in the "System Ready" state. Here, the oven 6 may be isolated from the gas flow, and gas flow into the source may be maintained through the by-pass tube 8. A swab sample 9 can be introduced into the oven 6 at any time with the 3 valves set to the same status as described for "System Ready".

In Table 1, "Sample Introduction to Oven" signifies the start of a fixed thermal desorption period which may also be referred to as the sample pre-concentration time.

At the end of this fixed time period, the valves may be switched to the "Sample Introduction to MS" state, e.g. where the by-pass valve 3 is closed and the oven inlet valve 1 and oven outlet valve 2 are opened, i.e. so as to sweep the oven volume into the ionisation source.

After a fixed MS analysis period, e.g. where the analyte signal has fallen to a level that approaches the background noise level, the valves may be returned to the "System Ready" state to await the next swab sample 9. The previous swab may now be removed from the system.

To demonstrate the benefits of analyte pre-concentration using the embodiment shown in FIG. 1, a switchable swab inlet system was constructed with an oven volume of approximately 10 mL and manually operated Swagelok valves that were connected with ¼-inch stainless steel tubing. A reduction of the total internal volume of the system would result in a further increase in analyte concentration in the carrier gas.

A 2 µL sample of a 1 ng/µL solution of dinitrotoluene (DNT) was spotted onto a 50 mm-diameter cotton swab and introduced into the swab oven which was set to a temperature of 175° C. A nitrogen gas flow of 200 L/hr was used for both the inlet system and the annular heater flows. These flows were observed to have a strong influence on the sensitivity of the total detection system. A single quadrupole MS detector was used in single ion recording mode, where the negative ions [M-H]⁻ and [M-CH₃]⁻ of DNT were chosen for analysis.

Figure 3:
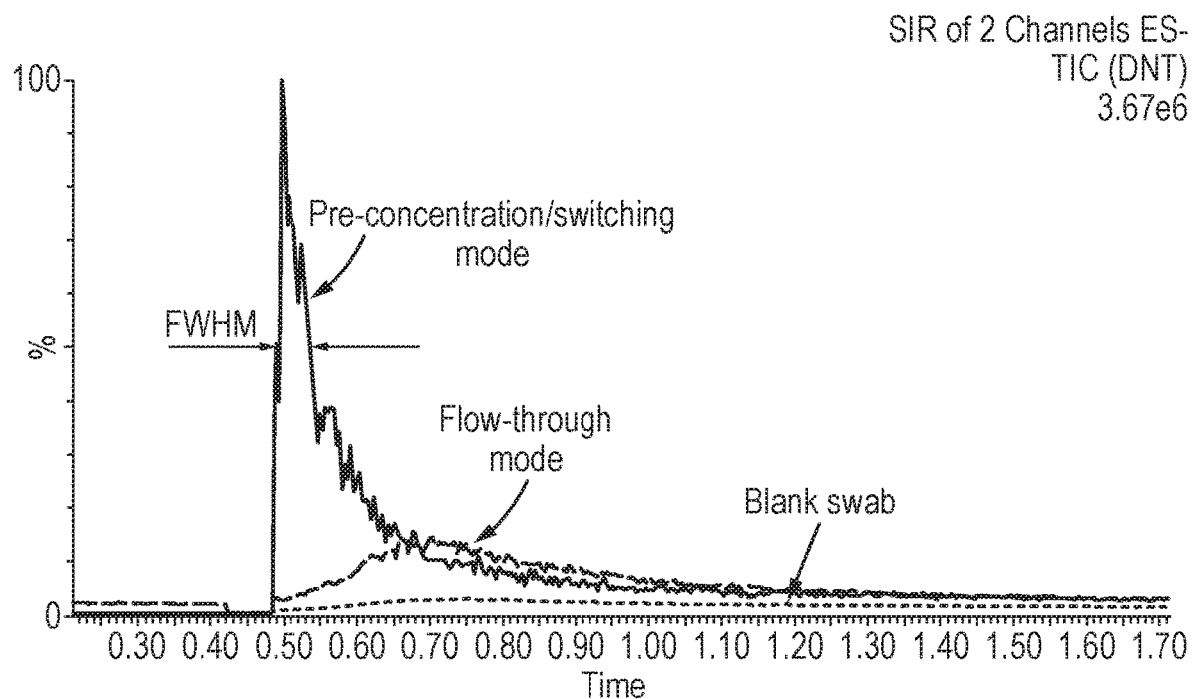
FIG. 3 shows plots of ion current versus time for data acquired using the conventional "flow-through" mode and the "pre-concentration" mode in accordance with various embodiments.

FIG. 3 shows the response profiles (ion current versus time) for the monitoring of the two characteristic DNT ions using both the conventional and the switched modes of inlet system operation.

The signal intensity profile labelled "flow-through mode" represents the conventional desorption method where the swab is introduced into the oven with a constant gas flow into the ion source. Referring to FIG. 1, this mode was obtained by introducing the sample swab whilst the by-pass valve 3 was closed and the inlet 1 and outlet 2 valves were open. As can be seen from FIG. 3, this produces a slowly evolving DNT profile with a large peak width (FWHM).

In contrast, using the oven switching technique according to various embodiments, with a sample pre-concentration time of 20 seconds, gives rise to an instantaneous response that is seven times more intense at its maximum ion intensity and exhibits a significantly reduced FWHM.

The profile labelled "blank swab" in FIG. 3 shows the response obtained from a swab that was spotted with 2 µL of solvent that did not contain DNT. The traces shown in FIG. 3 were aligned in time for illustrative purposes.

These data show, in particular, that sample pre-concentration in accordance with various embodiments is particularly beneficial for increasing the sensitivity of ambient detectors that rely on an intensity threshold to confirm a positive detection.

Figure 4:
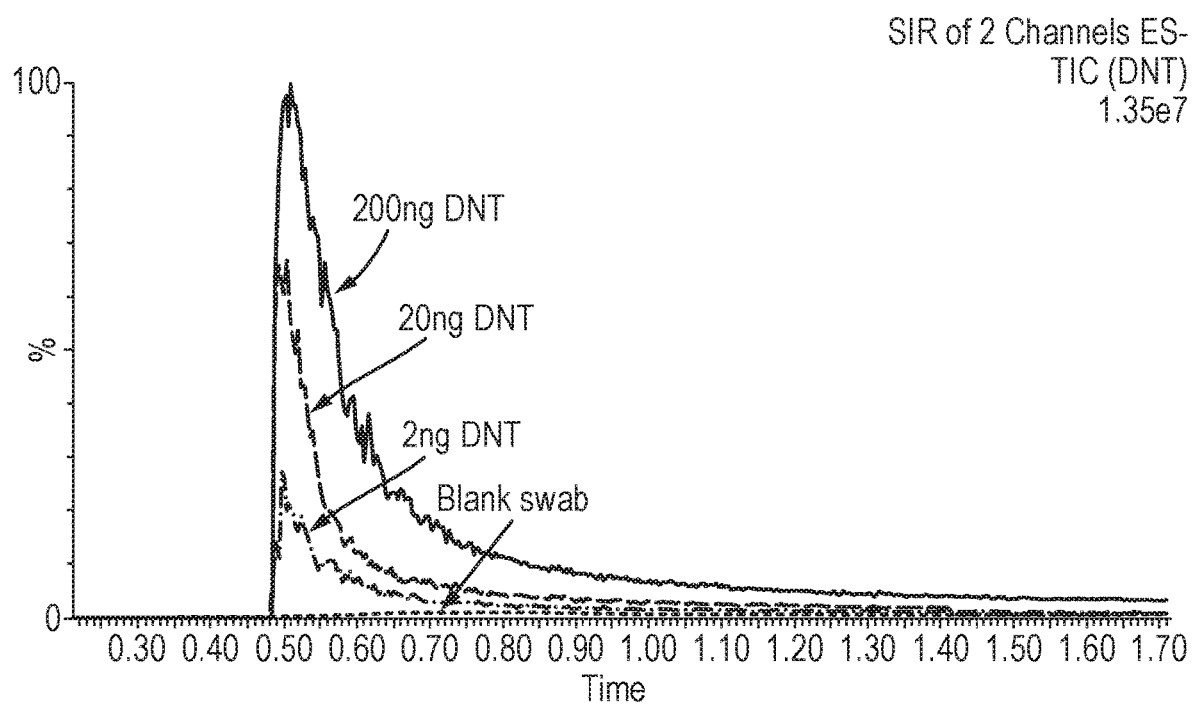
FIG. 4 shows plots of ion current versus time for data acquired using the "pre-concentration" mode in accordance with various embodiments.

FIG. 4 illustrates the effect on the signal response of increasing the amount of DNT to the swab oven when operating in the pre-concentration/switching mode of various embodiments. This shows that, although the system response is non-linear in terms of total detected ion signal, the technique retains a characteristic response profile and exhibits semi-quantitative detection over a sample quantity range that is relevant to current requirements in the field of ambient explosives detection.

The 3-valve inlet system embodiment of FIG. 1 is relatively straightforward to produce and operate. However, there is no means to constantly flush the oven volume when the system is in the by-pass ("System Ready") state. Flushing of the oven is desirable since it reduces the risk of oven contamination and decreases any background "hangover" signal, e.g. which may result from the analysis of particularly concentrated samples.

Figure 5:
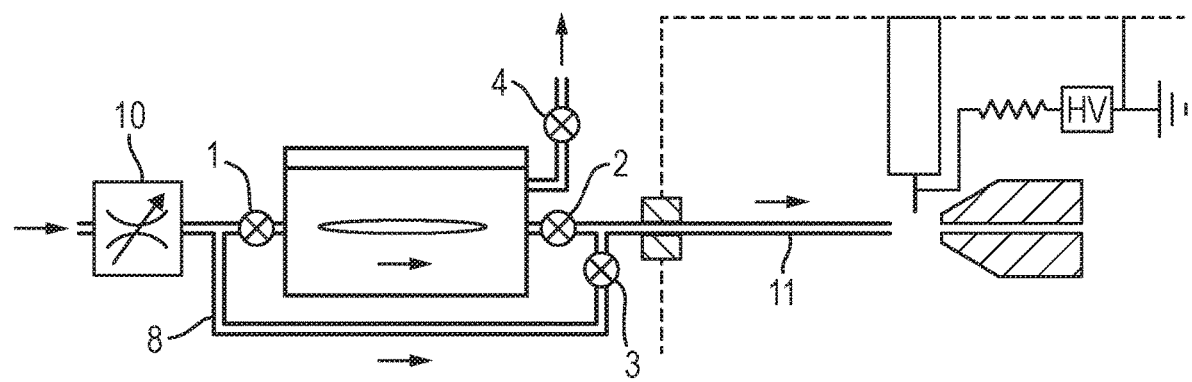
FIG. 5 shows schematically an ion source in accordance with various embodiments.

FIG. 5 illustrates a 4-valve embodiment which includes an additional oven flush outlet valve 4 that enables flushing of the oven volume, e.g. when the system is in the "System Ready" mode.

Where the total length of the flush outlet line is chosen to match the combined length of the by-pass tube 8 and the transfer line 11, then equal flow rates of gas may pass through the ambient source and the oven 6 when the outlet valve 2 is closed and the inlet valve 1, by-pass valve 3 and oven flush outlet valve 4 are open (e.g. in the "System Ready" mode). Where the total gas flow through the flow controller 10 is maintained at the same value as used in the 3-valve embodiment of FIG. 1, then the gas flow that enters the source through the transfer line 11 will be halved during the "System Ready" state.

In operation, the 4-valve embodiment shown in FIG. 5 may be operated using the valve sequences shown in Table 2.

TABLE 2

|  | Valve Status | | | |
| --- | --- | --- | --- | --- |
|  | Valve 1 | Valve 2 | Valve 3 | Valve 4 |
| System Ready | Open | Closed | Open | Open |
| Sample Introduction to Oven | Closed | Closed | Open | Closed |
| Sample Introduction to MS | Open | Open | Closed | Closed |
| System Ready | Open | Closed | Open | Open |

Referring to Table 2, in the system ready state the oven inlet valve 1, the bypass valve 3 and the flush outlet valve 4 may be open while the outlet valve 2 is closed, to allow the oven volume to be flushed. The oven inlet valve 1, the outlet valve 2, and the flush outlet valve 4 may be closed while the bypass valve 4 is open, when analyte is being accumulated, and then the oven inlet valve 1 and the outlet valve 2 may be opened, while the bypass valve 3 and the flush outlet valve 4 are closed, when analyte is being transferred to the ionisation region.

Figure 6:
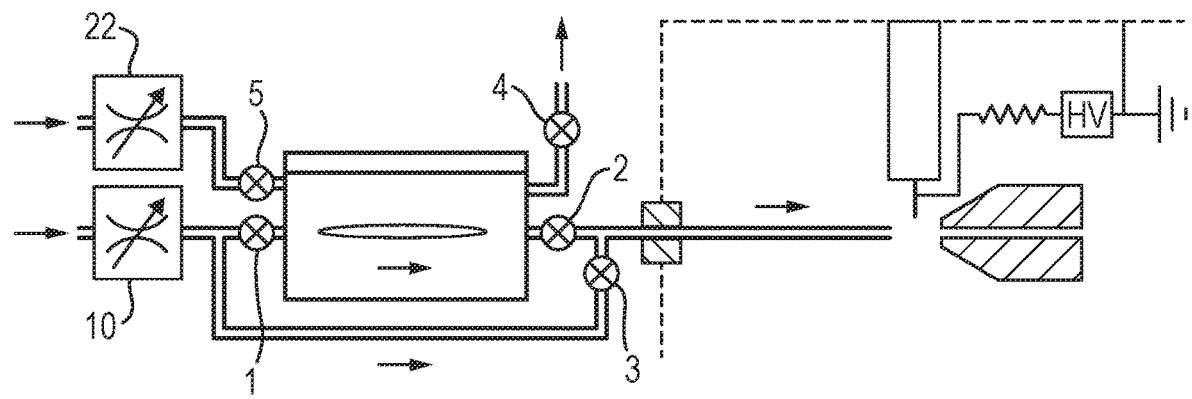
FIG. 6 shows schematically an ion source in accordance with various embodiments.

It may be desirable to have an inlet system where the oven flushing gas flow can be set independently of the by-pass and sample introduction gas flow rate. This may be achieved, for example, using the 5-valve inlet system shown in FIG. 6.

Here, an additional gas flow controller 22 and an oven flush inlet valve 5 have been added to the system to de-couple the flushing gas from the by-pass and sample introduction flows. This inlet system permits the use of higher flushing gas flow rates that will not interfere with the lower gas flow requirement for sample introduction into the ambient source. In operation, the 5-valve embodiment shown in FIG. 6 may be operated according to the valve sequences shown in Table 3.

TABLE 3

|  | Valve Status | | | | |
| --- | --- | --- | --- | --- | --- |
|  | Valve 1 | Valve 2 | Valve 3 | Valve 4 | Valve 5 |
| System Ready | Closed | Closed | Open | Open | Open |
| Sample Introduction to Oven | Closed | Closed | Open | Closed | Closed |
| Sample Introduction to MS | Open | Open | Closed | Closed | Closed |
| System Ready | Closed | Closed | Open | Open | Open |

Referring to Table 3, in the system ready state the bypass valve 3, the flush outlet valve 4 and the flush inlet valve 5 may be open, while the oven inlet valve 1 and the outlet valve 2 may be closed, to allow the oven volume to be flushed. The oven inlet valve 1, the outlet valve 2, the flush outlet valve 4, and the flush inlet valve 5 may be closed while the bypass valve 3 is open, when analyte is being accumulated, and then the oven inlet valve 1 and the outlet valve 2 may be opened, while the bypass valve 3, the flush outlet valve 4, and the flush inlet valve 5 are closed, when analyte is being transferred to the ionisation region.

Various embodiments describe a method of sample pre-concentration by the use of a sequence of valve switching operations. It should be noted that the hardware permits the system to be used in a conventional flow-through mode of operation, if desired. For example, the system may be configured to switch between the flow-through and switched modes of operation.

In addition, one or more purging substrates may be incorporated into the oven 6, e.g. to selectively remove gas phase components that may inhibit the detection of target analytes. Suitable purging substrates may include, for example, silica-based, cross bonded beads with selected functional groups such as amines, etc. According to various embodiments, the substrate comprises a porous assembly that is located at the exit of the oven (e.g. adjacent to the outlet valve 2), i.e. such that the oven gas is forced to pass through the substrate or purge volume. This will increase the effectiveness of the substrate. This substrate or purge volume may also or instead extend into the transfer line 11.

Figure 7:
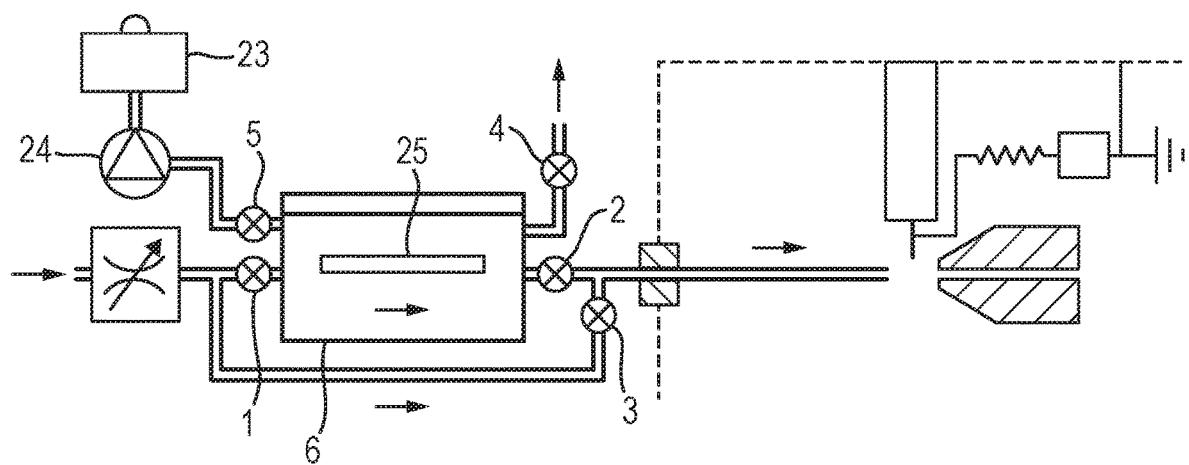
FIG. 7 shows schematically an ion source in accordance with various embodiments.

FIG. 7 illustrates an embodiment in which the inlet system is modified to operate in a "purge and trap" manner. In this embodiment, a test volume 23, which could for example be a suitcase, is connected to the inlet of a pump 24. The outlet of the pump 24 may be connected to the sample oven 6, e.g. via the oven inlet valve 5. The swab from the earlier embodiments may be replaced by an adsorbate 25 that may be located in the oven 6.

Suitable adsorbates may include, for example charcoal, poly(2,6-diphenyl-p-phenylene oxide) (known commercially as Tenax®) or silica-based, cross bonded beads with selected functional groups, and the like.

Additionally or alternatively, an adsorber such as a cryotrap may be used to adsorb analytes, and e.g. to selectively desorb them as the oven temperature is ramped.

In operation, the embodiment shown in FIG. 7 may be operated using the valve sequences shown in Table 4.

The oven heater may be switched off so that the oven is close to room temperature. The inlet valve 5 and the outlet valve 4 may be opened and the pump 24 may pump the test volume 23, e.g. such that analyte passes over the adsorbate 25 where some of the analyte molecules may become trapped on the adsorbate surface (or within the adsorbate or adsorber). During this period, the inlet 1 and outlet 2 valves may be closed and the bypass valve 3 may be open.

After an appropriate trapping time period, valves 4 and 5 may be closed and the oven heater 6 may be turned on.

After an appropriate sample pre-concentration period, by-pass valve 3 may be closed and the inlet 1 and outlet 2 valves may be opened to admit the analytes into the ambient ionization source.

TABLE 4

|  | Valve Status | | | | |
| --- | --- | --- | --- | --- | --- |
|  | Valve 1 | Valve 2 | Valve 3 | Valve 4 | Valve 5 |
| System Ready | Closed | Closed | Open | Open | Open |
| Purge and Trap Test Volume | Closed | Closed | Open | Open | Open |
| Desorb Trap | Closed | Closed | Open | Closed | Closed |
| Sample Introduction to MS | Open | Open | Closed | Closed | Closed |
| System Ready | Closed | Closed | Open | Open | Open |

It will be appreciated that the system can serve as a "purge and trap" system, e.g. for air analysis, as opposed to for analysis of swabs.

In general, the various inlet, outlet and bypass valves according to any of the embodiments may comprise any suitable valve type. In some embodiments, e.g. to allow for a more controllable switching, at least some of the valves may comprise solenoid valves. For instance, solenoid valves can be rapidly switched, e.g. according to any of the valve sequences described herein, under the control of a suitable electronic control system.

However, solenoid valves may need to be positioned some distance away from the oven for reliable operation.

Thus, in embodiments, to allow valves to be positioned closer to the oven, at least some of the valves may comprise non-return (i.e. check) valves. It will be appreciated that non-return valves may generally be more suited for high temperature operation.

Figure 8:
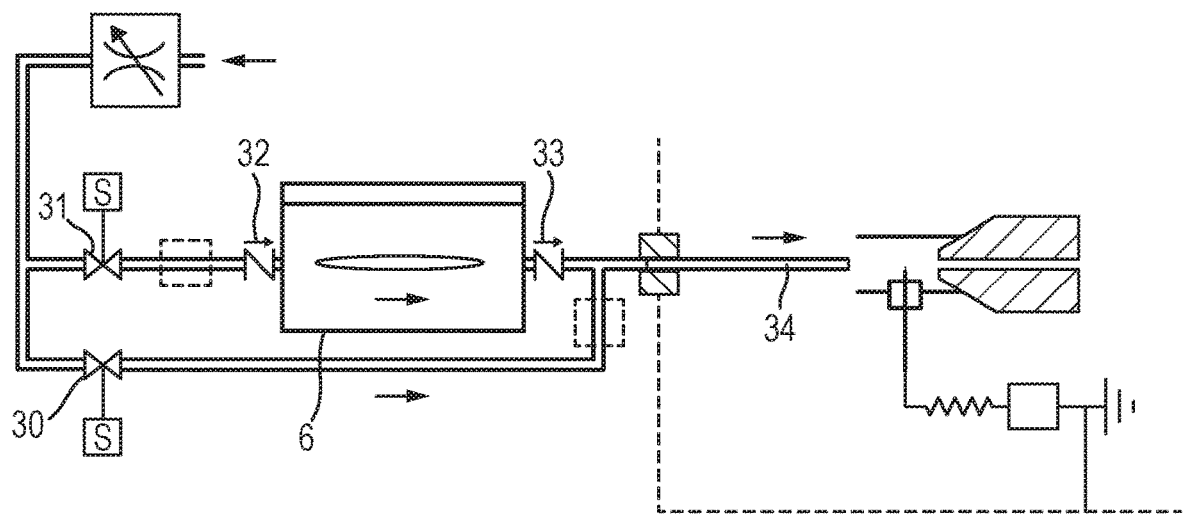
FIG. 8 shows schematically an ion source in accordance with various embodiments.

FIG. 8 illustrates an embodiment in which two high-temperature non-return valves 32, 33 are mounted respectively on the inlet and outlet of the oven 6, allowing the inlet solenoid valve 31 to be relocated to a cooler region (e.g. where the temperature is less than 100° C., to allow for a more reliable operation of the solenoid valve 31).

In FIG. 8, the inlet line to the oven 6 thus comprises a solenoid valve 31 and a non-return valve 32. The inlet solenoid valve 31 and non-return valve 32 may generally be operated in synchronisation with one another, i.e. such that the non-return valve 32 is opened (closed) when the inlet solenoid valve 31 is opened (closed).

In FIG. 8 the bypass valve comprises a solenoid valve 30 since this can already be located in a cooler region away from the oven 6. However, the bypass valve 30 could also be a non-return valve, or indeed any other type of valve, as desired.

Although the FIG. 8 embodiment uses a combination of solenoid and non-return valves, particularly for the inlet line, it will be appreciated that this is not necessary and in some embodiments only non-return valves (or only solenoid valves) may be used, e.g. for the other arrangements described herein. In other words, the non-return valves may be used instead of solenoid valves, or may be used in addition to solenoid valves, but allowing the solenoid valves to be relocated to a cooler region away from the over.

It will be appreciated that non-return valves require a certain minimum pressure differential ('cracking' pressure) to operate, with the minimum operating pressure differential typically being between about 100 and 500 mbar.

However, there may be a significant pressure drop across the oven 6 if gas is allowed to leak from the oven 6. The oven 6 may therefore be provided with additional sealing to help maintain sufficient pressure for operating the downstream non-return valve 33.

In embodiments, a flow restrictor 34 may also be provided at the inlet to the source (shown in FIG. 8 to be an APCI source, although any other suitable source, including HePI may of course be used). This is illustrated in FIG. 8. However, it will be appreciated that such a flow restrictor 34 may of course be used for any of the configurations presented herein.

The flow restrictor 34 may, for example, comprise a stainless steel restrictor having relatively constricted dimensions (e.g. 50×1.6×0.25 mm). Any other suitable flow restrictor 34 may of course be used.

The flow restrictor 34 influences the flow dynamics in the source region, and its design may therefore be optimised in this respect. The flow restrictor 34 may thus be used to control the flow dynamics in the flow region. For instance, the spacing between the end of the flow restrictor 34 and the source region may be set to control an amount of dispersion in the source region. Other arrangements would of course be possible.

Figure 9:
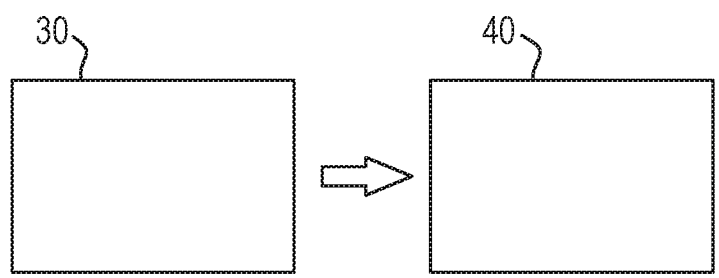
FIG. 9 shows schematically an analytical instrument source in accordance with various embodiments.
Figure 9:
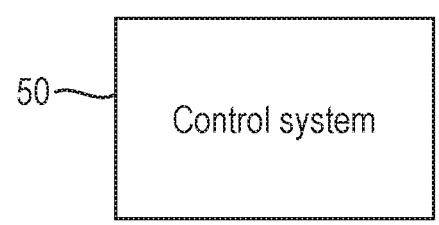

FIG. 9 illustrates schematically an analytical instrument according to various embodiments that comprises an ion source 30, e.g. which may comprise any one of the ion sources of FIGS. 1, 2 and 5-7, and a mass and/or ion mobility spectrometer 40 that is configured to analyse ions generated by the ion source 30.

The analytical instrument may comprise a control system 50, e.g. that is configured to control the operation of the ion source and/or analytical instrument, e.g. in the manner of the various embodiments described herein. The control system may comprise suitable control circuitry that is configured to cause the ion source and/or instrument to operate in the manner of the various embodiments described herein. The control system may comprise suitable processing circuitry configured to perform any one or more or all of the necessary processing and/or post-processing operations in respect of the various embodiments described herein. The control system 50 may be implemented in hardware or software, as desired. In various embodiments, the control system may comprise a suitable computing device, a microprocessor system, a programmable FPGA (field programmable gate array), and the like.

Various embodiments provide a fast, novel way of detecting low levels of ambient samples by pre-concentrating the analyte prior to ambient MS analysis.

Although the present invention has been described with reference to preferred embodiments, it will be understood by those skilled in the art that various changes in form and detail may be made without departing from the scope of the invention as set forth in the accompanying claims.

The invention claimed is:

1. A method of ionisation comprising:
heating a sample such that analyte is released from the sample in one or more heating and/or accumulation regions, wherein a first inlet valve and a first outlet valve are operated in a closed state while accumulating the analyte;
accumulating analyte released from the sample; and then
passing the accumulated analyte to an ionisation region by opening the first inlet valve and the first outlet valve, and ionising the analyte.

2. A method as claimed in claim 1, comprising:
accumulating analyte released from the sample during a first period of time; and
passing the accumulated analyte to the ionisation region during a second period of time that follows the first period of time, wherein the second period of time is shorter than the first period of time.

3. A method as claimed in claim 1, wherein the method comprises:
providing a bypass flow tube and a bypass valve;
operating the bypass valve in an open state, while accumulating the analyte in the one or more heating and/or accumulation regions, such that gas flows through the bypass flow tube and bypasses the one or more heating and/or accumulation regions; and
operating the bypass valve in a closed state, while passing the accumulated analyte to the ionisation region, such that gas passes through the one or more heating and/or accumulation regions and does not flow through the bypass flow tube.

4. A method as claimed in claim 1, wherein the method comprises:
operating the first inlet valve in an open state and operating a second outlet valve in an open state before accumulating the analyte and/or after passing the accumulated analyte to the ionisation region.

5. A method as claimed in claim 4, wherein the method comprises:

operating a second inlet valve in an open state, operating the second outlet valve in an open state, operating the first inlet valve in a closed state, and operating the first outlet valve in a closed state before accumulating the analyte and/or after passing the accumulated analyte to the ionisation region.

6. A method as claimed in claim 1, further comprising:
passing gas from a test volume into the one or more heating and/or accumulation regions before heating the sample, wherein the sample is adsorbed onto or within an adsorbate or adsorber that is provided within or as part of the one or more heating and/or accumulation regions.

7. A method of ionisation comprising:
passing gas from a test volume into one or more heating and/or accumulation regions, where the one or more heating and/or accumulation regions comprise an adsorbate or adsorber;
heating the adsorbate or adsorber such that analyte is released from the adsorbate or adsorber;
accumulating analyte released from the adsorbate or adsorber, wherein a first inlet valve and a first outlet valve are operated in a closed state while accumulating the analyte; and then
passing the accumulated analyte to an ionisation region by opening the first inlet valve and the first outlet valve, and ionising the analyte.

8. A method of mass and/or ion mobility spectrometry comprising:
ionising analyte using the method of claim 1 so as to produce analyte ions; and
analysing the analyte ions or ions derived from the analyte ions.

9. An ion source comprising:
a heater configured to heat a sample such that analyte is released from the sample;
one or more accumulation regions arranged to accumulate analyte released from the sample;
a first inlet valve and a first outlet valve; and
an ionisation region comprising an ionisation device configured to ionise the analyte;
wherein the ion source is operable to heat the sample using the heater and accumulate the analyte released from the sample in said one or more accumulation regions whilst the first inlet valve and first outlet valve are in a closed state, and then pass the accumulated analyte to the ionisation region by opening the first inlet valve and the first outlet valve.

10. An ion source as claimed in claim 9, wherein the ion source is operable:
to accumulate analyte released from the sample during a first period of time; and
to pass the accumulated analyte to the ionisation region during a second period of time that follows the first period of time, wherein the second period of time is shorter than the first period of time.

11. An ion source as claimed in claim 9, wherein the one or more accumulation regions comprises one or more chambers.

12. An ion source as claimed in claim 9, further comprising a bypass flow tube and a bypass valve;
wherein the ion source is operable:
to operate the bypass valve in an open state while accumulating the analyte in the one or more accumulation regions, such that gas flows through the bypass flow tube and bypasses the one or more or accumulation regions; and
to operate the bypass valve in a closed state while passing the accumulated analyte to the ionisation region, such that gas passes through the one or more accumulation regions and does not flow through the bypass flow tube.

13. An ion source as claimed in claim 9, further comprising a second outlet valve;
wherein the ion source is operable:
to operate the inlet valve in an open state and to operate the second outlet valve in an open state before accumulating the analyte and/or after passing the accumulated analyte to the ionisation region.

14. An ion source as claimed in claim 13, further comprising a second inlet valve;
wherein the ion source is operable:
to operate the second gas inlet valve in an open state, to operate the second outlet valve in an open state, to operate the first gas inlet valve in a closed state, and to operate the first gas outlet valve in a closed state before accumulating the analyte and/or after passing the accumulated analyte to the ionisation region.

15. An ion source as claimed in claim 9, wherein the one or more accumulation regions comprises an adsorbate or adsorber.

16. An ion source as claimed in claim 15, wherein:
the ion source is operable to pass gas from a test volume into the one or more accumulation regions before heating the sample, wherein the sample is adsorbed on or within the adsorbate or adsorber.

17. A mass and/or ion mobility spectrometer comprising:
an ion source of claim 9; and
an analyser configured to analyse analyte ions produced by the ion source or ions derived from analyte ions produced by the ion source.

18. A method as claimed in claim 3, wherein when the bypass valve is operated in the open state, the gas flows through the bypass flow tube to the ionisation region.

* * * * *